United States Patent [19]

Cominetta et al.

[11] Patent Number: 4,634,534
[45] Date of Patent: Jan. 6, 1987

[54] MODULAR PLASTIC PACKING FOR THE BIOLOGICAL TREATMENT OF WASTE WATERS BY PERCOLATION

[75] Inventors: Gilberto Cominetta, Milan; Claudio Oggionni, Cernusco Sul Naviglio, both of Italy

[73] Assignee: BS Smogless S.p.A., Milan, Italy

[21] Appl. No.: 728,945

[22] Filed: Apr. 30, 1985

[30] Foreign Application Priority Data

Sep. 21, 1984 [IT] Italy .............................. 23267/84[U]

[51] Int. Cl.⁴ ............................................... B01F 3/04
[52] U.S. Cl. .................................. 210/150; 261/112; 261/DIG. 72
[58] Field of Search ................ 210/150, 151; 261/112, 261/DIG. 72

[56] References Cited

U.S. PATENT DOCUMENTS

| | | | |
|---|---|---|---|
| 3,232,865 | 2/1966 | Quinn et al. | 210/150 X |
| 3,262,682 | 7/1966 | Bredberg | 261/29 |
| 3,347,381 | 10/1967 | Minch et al. | 210/150 |
| 3,618,778 | 11/1971 | Benton et al. | 210/150 |
| 4,296,050 | 10/1981 | Meier | 261/112 |
| 4,385,012 | 5/1983 | Priestley | 210/150 X |
| 4,455,339 | 6/1984 | Meier | 261/112 X |
| 4,497,751 | 2/1985 | Pluss | 261/DIG. 72 |

Primary Examiner—Tom Wyse
Attorney, Agent, or Firm—Diller, Ramik & Wight

[57] ABSTRACT

In a modular plastic packing for the biological treatment of waste waters by percolation, of the type constituted by an alternate array of undulated sheets united to each other, so as to define a plurality of inclined channels, in such a way as to supply an intersecting flow of fed liquors, and in each one of said sheets the generatrices of the undulations being shaped as flat parallel crests directed in an inclined direction relatively to the plane on which the packing leans, on the surface of each sheet comprised between each pair of adjacent crests a plurality of bossages substantially flat and parallel to said supporting plane is provided.

4 Claims, 4 Drawing Figures

MODULAR PLASTIC PACKING FOR THE BIOLOGICAL TREATMENT OF WASTE WATERS BY PERCOLATION

Since early Sixties a type of modular plastic packing to be used in cooling towers is known, which was subsequently adopted also for the biological treatment of waste waters; see e.g. U.K. Pat. No. 962.432.

Such a plastic packing is constituted by an alternate array of PVC flat and undulated sheets, so as to supply a light, strong and rigid structure, able to bear high loads, and it is known to those skilled in the art as Flocor packing.

The purification process which occurs in Flocor biological towers is of the type involving biological oxidation under natural aeration conditions.

The effluent to be treated is fed to the top of the tower and some weeks later the elements constituting the filtering bed are coated by a biological coat formed by a bacterial culture.

The bacterial coat is able to grow absorbing the polluting charge transported by the liquors flowing along its surface.

When the colony has reached a certain size, the bacteria are separated therefrom and are dragged away by the mechanical action carried out by the liquid, as easily settling clumps.

A facility with a high-rate percolator filter is characterized by a high resistance to the shocks from organic or hydraulic load.

It has been possible to observe that, even if such a filter is left inoperative over some weeks, it can be reactivated and brought to its initial efficiency within a few days.

The optimum pH value for the operation of the tower is comprised within the range of from 6,5 to 8,5 and the ideal value is of $7,5 \pm 0,5$.

In order to obtain the best results, moreover, it is necessary to adjust the nutritional balancing, so that the ratio BOD/N/P is of 100/7/1. It should be noted that in this case "N" is the useable free ammoniacal nitrogen and not the total organic nitrogen (Nitrogen according to Kjeldahl). "P" is the phosphorus determined according to the normal test with ammonium molybdate.

Usually, nitrogen and phosphorus are added as a salt solution of 10–20% concentration, and are introduced into the liquors by means of a metering pump.

The aeration of the tower which is necessary in order to supply the oxygen demanded by the biological process is obtained by simple natural draught through ports provided at the base of the tower, and having an overall area of at least 5–7% of tower cross section.

Such ports may also be partly shielded in order to limit the air inlet in Winter season.

During the subsequent years, similar modules were introduced in the field, constituted by an alternate array of flat and undulated sheets of plastic material (vertical-flow packings).

Still later, for the same process a material was introduced, which had already been adopted as the packing for cooling towers, constituted by an alternate array of undulated sheets (the interposition of flat sheets being avoided), forming a sequence of flow channels intersecting each other, and comprised between two adjacent sheets (Intersecting-flow packing; see e.g. U.S. Pat. No. 3.262.682).

Such a configuration allows a continuous redistribution of air and water both in the vertical and in the horizontal direction.

The purpose of the present invention is to improve in a packing of the intersecting-flow type, mainly the residence time and the purification power of the bacterial colony.

In order to achieve this purpose, and other advantages which will be disclosed hereinunder, the present invention provides a modular plastic packing for the biological treatment of waste waters by percolation, of the type constituted by an alternate array of undulated sheets united to each other, so as to define a plurality of inclined channels, in such a way as to supply an intersecting flow of fed liquors, and in each one of such sheets the generatrices of the undulations being shaped as flat parallel crests directed in an inclined direction relatively to the plane on which the packing leans, characterized in that on the surface of each sheet comprised between each pair of adjacent crests a plurality of bossages substantially flat and parallel to said supporting plane is provided.

To the purpose of better understanding characteristics and advantages of the invention, a non limitative Example of a practical embodiment thereof is hereinunder disclosed, with reference to the figures of attached drawings.

Figure 1:
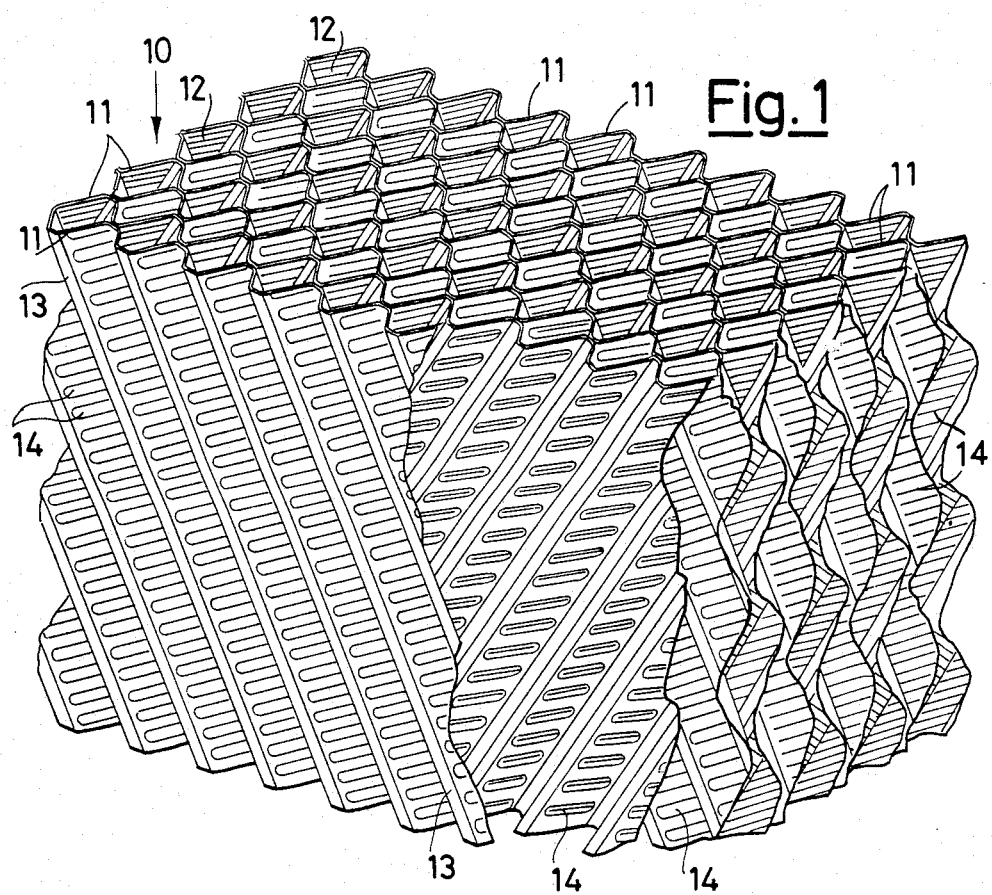
FIG. 1 shows a perspective view of a packing according to the invention.
Figure 4:
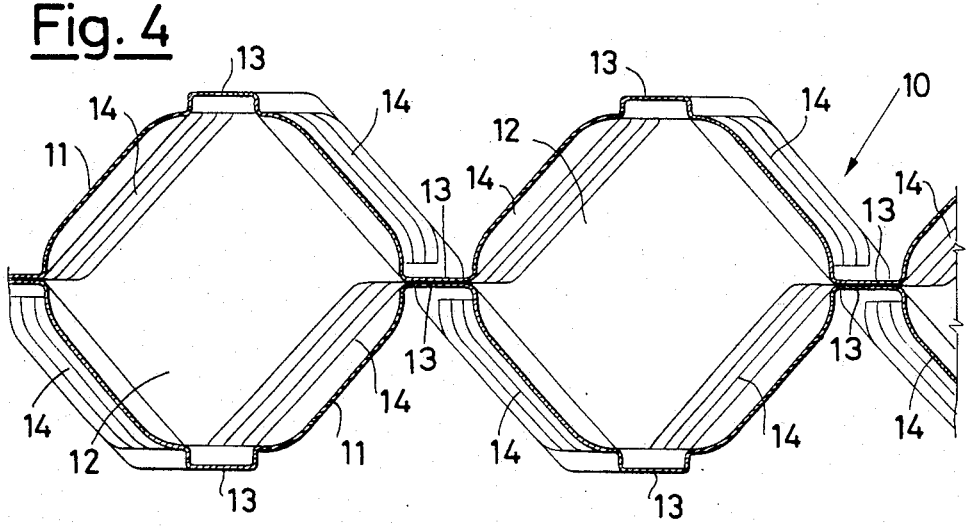
FIG. 4 shows finally a sectional bottom view, along the line IV—IV of FIG. 2.
Figure 2:
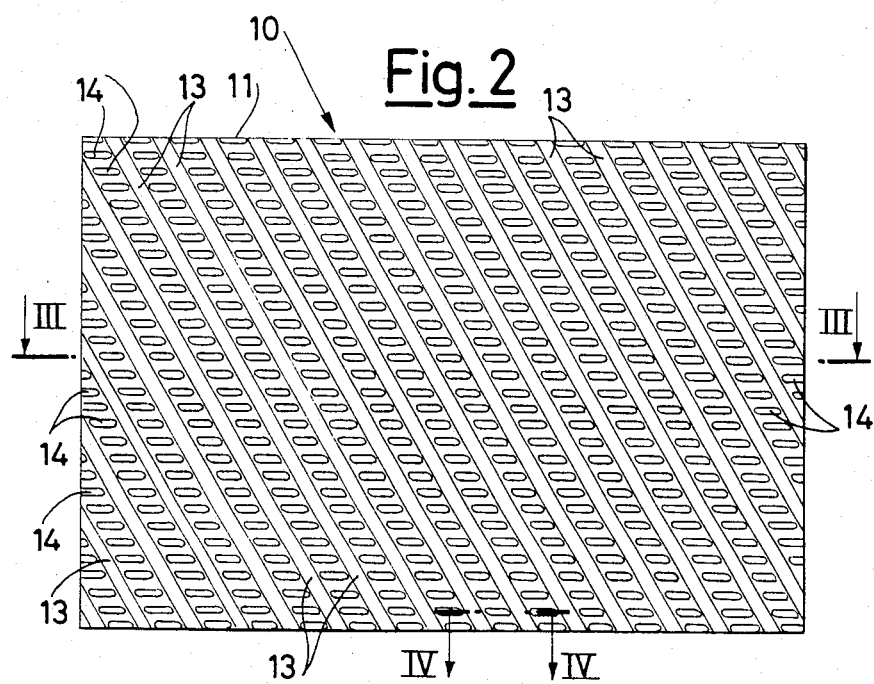
FIG. 2 shows an elevation view of the packing of FIG. 1.
Figure 3:
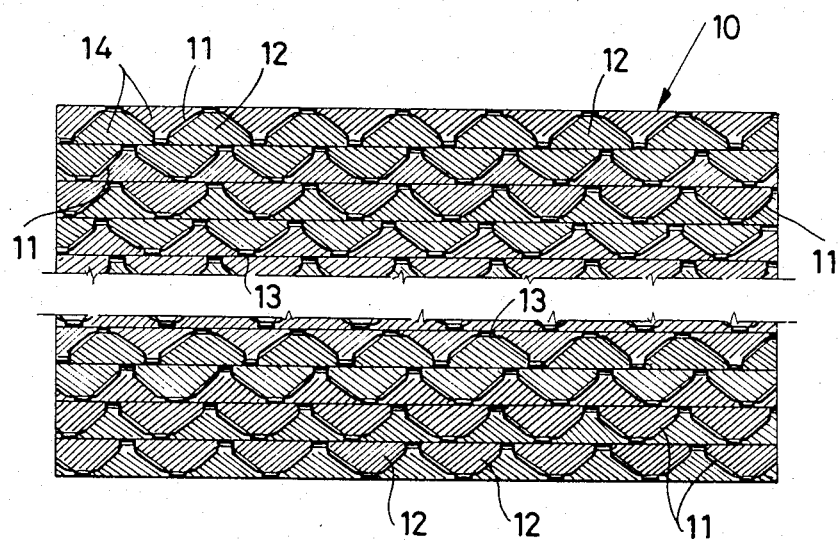
FIG. 3 shows a sectional view along the line III—III of the packing of FIG. 2.

According to the figures mentioned, a modular packing 10 is constituted by an alternate array of sheets 11 of undulated plastic material, united to each other, so as to define a plurality of inclined channels 12 intersecting with each other, according to the pattern known as intersecting flow. In each of said undulated sheets 11, the generatrices corrresponding to the maximum amplitude of the undulations are shaped as flat crests 13, parallel to each other, and directed in an inclined direction according to a predetermined angle relatively to the packing supporting plane.

On the surface of each sheet 11 comprised between each pair of adjacent crests 13 bossages 14 are provided, positioned in a direction substantially horizontal and parallel relatively to the packing supporting plane.

Preferably, and this is in fact the case shown in the Example, the bossages 14 extend throughout the sheet surface comprised between a crest 13 and the subsequent crest.

Such bossages therefore constitute along the whole surface of each inclined channel 12 an efficient means of slowing down of the flow of the liquors to be treated.

In particular, it has been experimentally found that the specific positioning of the bossages envisaged by the invention increases the residence time inside the packing means and hence the purification power of the microorganisms adherent to the material. In particular, the residence time is increased to its maximum value when the bossages 14 extend over the whole length going from one crest 13 to the subsequent crest of the undulated sheets.

The horizontal bossage according to the invention causes a continuous mixing of the air and water flows with each other, at a distance of a few millimeters, such a mixing being thus added to the mixing effect caused by the intersecting flow characterizing the module and further enhancing the purification power of the bacterial colony.

Following the observations hereinabove referred to, tests have been carried out of comparison between two vertical-flow packings A and B, the first one with deep horizontal bossages (A), and the other one with a similar configuration, but with the bossages positioned inclined by about 30° relatively to the vertical direction.

It has been evidenced in that way a greater retention power, and a higher purification power of material A than of material B.

The same type of comparison has been carried out with two inftersecting-flow packings C and D, wherein C was always provided with horizontal bossages according to the invention, whilst D showed bossages inclined by about 30° relatively to the vertical direction.

In this case too, the retention time and the treatment power have been greater for material C than for material D, thus confirming what was hereinabove evidenced.

We claim:

1. A modular packing for the biological treatment of waste waters by percolation comprising a plurality of adjacent undulating sheets each defining a plurality of adjacent generally parallel channels inclined relative to a support plane thereof, immediately opposing adjacent pairs of said undulating sheets being positioned with their opposing channels oppositely inclined and in generally crossing relationship to each other thereby effecting intersecting flow of fed liquors therebetween, each channel having a generatrix shaped as a generally flat elongated crest with the flat crests of each sheet being in parallel relationship to each other, each channel including a wall at each side of and generally parallel to each crest, a plurality of spaced generally flat bossages projecting from each of said walls, and said bossages being generally parallel to each other and to said support plane.

2. The modular packing for the biological treatment of waste waters by percolation as defined in claim 1 wherein said bossages extend generally along the entire length of said walls.

3. The modular packing for the biological treatment of waste waters by percolation as defined in claim 2 wherein said each of said sheets is plastic.

4. The modular packing for the biological treatment of waste waters by percolation as defined in claim 1 wherein said each of said sheets is plastic.

* * * * *